United States Patent
Cook et al.

(10) Patent No.: US 6,941,437 B2
(45) Date of Patent: Sep. 6, 2005

(54) MEMORY ALLOCATION SCHEME (75) Inventors: Jeremy Cook, Nesttun (NO); Alexey Goloshubin, Bergen (NO)

(73) Assignee: Wind River Systems, Inc., Alameda, CA (US)

( * ) Notice: Subject to any disclaimer, the term of this patent is extended or adjusted under 35 U.S.C. 154(b) by 401 days.

(21) Appl. No.: 10/198,377

(22) Filed: Jul. 18, 2002

(65) Prior Publication Data

US 2003/0056076 A1 Mar. 20, 2003

Related U.S. Application Data (60) Provisional application No. 60/306,615, filed on Jul. 19, 2001.

(51) Int. Cl.[7] .............................................. G06F 12/00
(52) U.S. Cl. ...................... 711/173; 711/6; 711/154; 711/158; 711/170; 718/104
(58) Field of Search .......................... 711/173, 6, 154, 711/158, 170; 718/104

(56) References Cited

U.S. PATENT DOCUMENTS

| | | | |
|---|---|---|---|
| 5,394,545 A | 2/1995 | Emrick et al. | |
| 5,420,999 A | 5/1995 | Mundy | |
| 5,463,776 A | 10/1995 | Voigt et al. | |
| 5,675,793 A | * 10/1997 | Crick et al. | 713/1 |
| 5,757,386 A | 5/1998 | Celi, Jr. et al. | |
| 6,128,713 A | * 10/2000 | Eisler et al. | 711/159 |
| 6,219,678 B1 | * 4/2001 | Yelland et al. | 707/206 |
| 6,243,093 B1 | 6/2001 | Czerwinski et al. | |
| 6,701,420 B1 | * 3/2004 | Hamilton et al. | 711/170 |
| 2002/0108025 A1 | * 8/2002 | Shaylor | 711/203 |

OTHER PUBLICATIONS

Microsoft Computer Dictionary, Fourth Edition, definition of "process", pp 359.*

* cited by examiner

Primary Examiner—Stephen C. Elmore
(74) Attorney, Agent, or Firm—Davidson, Davidson & Kappel, LLC (57) ABSTRACT

A method for managing a memory is provided which comprises the steps of: receiving a request for a memory allocation from a first application, the request comprising a requested memory amount; estimating a total amount of a memory available to the first application; freeing a partition of the memory sufficient for the first application based on the requested memory amount; and allocating the partition to the first application. The memory can be freed in a number of ways, including, by shutting down other applications based upon a priority or priority state scheme, issuing a shut down request to another application, or by allowing the user to select an application to be shut down.

57 Claims, 6 Drawing Sheets

MEMORY ALLOCATION SCHEME

This application claims priority from U.S. Provisional Application Ser. No. 60/306,615, filed Jul. 19, 2001, the entire disclosure of which is hereby incorporated by reference.

BACKGROUND

An embedded system is a specialized computer used to control devices such as automobiles, home and office appliances, handheld units of all kinds as well as machines as sophisticated as space vehicles. In embedded systems, operating systems (OSes) and application functions are often combined in the same program.

In order to allow programming of embedded systems, various computer OSes and applications have been modified to function on the embedded systems. Because of the small size of embedded systems, memory is at a premium. As such, memory management, the process by which memory is made available to executing processes, allows larger OSes and applications to run on embedded systems. In the context of the present invention, the terms process, function, and the like are meant to broadly refer to any executable software entity.

Different compilers and OSes manage memory differently. A heap is one way to manage the area of memory in an application partition in which space is dynamically allocated and released on demand. The heap begins at the low-memory end of the application partition and extends upward in memory. The heap contains virtually all items that are not allocated on the stack. For instance, the application heap contains the application's code segments and resources that are currently loaded into memory. The heap also contains other dynamically allocated items such as window records, dialog records, document data, and so forth.

SUMMARY

In accordance with a first embodiment of the present invention, a method for managing a memory is provided. After receiving a request for a memory allocation from a first application, which comprises a requested memory amount, the total amount of a memory available to the first application is determined. Next, a partition of the memory sufficient for the first application based on the requested memory amount is freed. The partition is then allocated to the first application.

In accordance with a second embodiment of the present invention, a memory is managed by assigning a priority to each of a plurality of processes. A request, which includes a requested memory amount, is received from a first one of the plurality of processes. A total amount of memory available for allocation is then determined. If the total amount of memory available is less than the requested amount, a partition of the memory equal to at least the requested amount is freed by freeing memory from one or more of the plurality of processes having an assigned priority which is lower than the assigned priority of the first process. The partition of the memory is then allocated to the first process.

In accordance with a third embodiment of the present invention, a memory is managed by assigning a state-priority to each state of a plurality of processes. A request is received for a memory allocation from a first process of the plurality of processes, the first process being in a first state and having a first assigned state-priority. An determination of a total amount of memory available for allocation is performed. If the total amount is greater than or equal to the request, a partition of memory is allocated to the first process in an amount equal to at least the requested amount. However, if the total amount is less than the request, one or more of the processes having a current state-priority which is lower than the first assigned state-priority are shut-down, starting with the process with the lowest assigned state-priority, so that memory equal or greater to the request minus the total amount is freed. A partition of memory is then allocated to the first process in an amount equal to at least the requested amount.

In accordance with a fourth embodiment of the present invention, a priority to each of a plurality of processes is assigned. A request for memory from a first process of the plurality of processes is received, wherein the first process has a first priority. A total amount of memory available for allocation is then determined. If the total amount is greater than or equal to the request, a partition of memory to the first process in an amount equal to at least the requested amount is then allocated. However, if the total amount is less than the request, one or more of the plurality of processes with an assigned priority lower than the first priority is shut down, starting with the process of the plurality of processes having the lowest assigned priority, so that memory equal or greater to the request minus the total amount is freed. A partition of memory to the first process in an amount equal to at least the requested amount is then allocated.

In accordance with a fifth embodiment of the present invention, a method for managing memory is provided wherein a request for a memory allocation from a requesting process is then received. A total amount of memory available for allocation is determined. If the total amount is greater than the request, sufficient memory is allocated to the requesting process to fulfill the request. However, if the total amount is less than the request, one or more other processes to shut down are selected. Based upon a user selection, the selected processes are shut-down, any memory associated with the processes is freed, and the steps of selecting and shutting down are repeated until memory equal or greater to the request minus the total amount is freed. Sufficient memory to fulfill the request is then allocated to the requesting process.

In accordance with a sixth embodiment of the present invention, a memory manager comprises a processing device coupled to a memory. The processing device is operative to receive a request for a memory allocation from a requesting process and to determine a total amount of memory available for allocation. The processing device compares the total amount to the request, and if the total amount is greater than or equal to the request, allocates sufficient memory to the requesting process to fulfill the request. However, if the total amount is less than the request, the processing device selects one or more processes of the plurality of processes to shut down, shuts down the selected processes, frees any memory associated with the processes, and allocates sufficient memory to the requesting process to fulfill the request.

In another embodiment of the present invention, a system comprises a plurality of processes, a memory, and a memory manager. A requesting process of the plurality of processes is operative to send a request for a memory allocation to the memory manager. In this regard, the request has associated therewith a requested amount of memory. The memory manager is operative to receive the request for a memory allocation from the requesting process. The memory manager determines a total amount of memory available for allocation and compares the total amount to the requested amount. If the total amount is greater than or equal to the request, an amount of memory equal to at least the requested amount is allocated to the requesting process. However, if the total amount is less than the request then (i) one or more of the plurality of processes is selected to be shut down, (ii) shut down of the selected processes is requested, (iii) any memory associated with the processes that have shut down is freed; and (i) through (iii) are repeated until memory equal or greater to the request minus the total amount is freed. An amount of memory equal to at least the requested amount of the requesting process is then allocated. The selected one or more of the plurality of processes are operative to shut-down when requested by the memory manager and de-allocate their memory when shutting down.

In accordance with another embodiment of the present invention, a system comprises a memory manager, a memory, and a plurality of processes, each process having one or more states, each state having a corresponding assigned state-priority. A requesting process of the plurality of processes is operative to send a request for a memory allocation to the memory manager, the request having associated therewith a requested amount of memory. The memory manager is operative to receive the request for a memory allocation from the requesting process of the plurality of processes. The memory manager determines a total amount of memory available for allocation and compares the total amount to the requested amount. If the total amount is greater than or equal to the requested amount, an amount of memory equal to at least the requested amount is allocated to the requesting process. On the other hand, if the total amount is less than the request, one or more processes is selected to shut down based upon the current assigned state-priorities. Shut down of the selected processes is then requested. The one or more of the plurality of processes are operative to shut-down when requested by the memory manager and to de-allocate memory when shutting down and any memory associated with the processes that shut down is freed. An amount of memory equal to at least the requested amount to the requesting process is then allocated by the memory manager.

In yet another embodiment of the present invention, a computer readable medium, having stored thereon, computer executable process steps operative to control a computer to manage memory, is provided. A request for a memory allocation is received from a first application, the request comprising a requested memory amount. A total amount of a memory available to the first application is determined. A partition of the memory sufficient for the first application is freed based on the requested memory amount. The partition is then allocated to the first application.

Another embodiment of the present invention provides for a computer readable medium, having stored thereon, computer executable process steps operative to control a computer to manage memory. A priority is assigned to each of a plurality of processes. A request is received from a first one of the plurality of processes, the request comprising a requested memory amount. A total amount of memory available for allocation is then determined. If the total amount of memory available is less than the requested amount, a partition of the memory equal to at least the requested amount is freed by freeing memory from one or more of the plurality of processes having assigned priority which is lower than the assigned priority of the first process. The partition of the memory is then allocated to the first process.

In another embodiment in accordance with the present invention, a computer readable medium, having stored thereon, computer executable process steps operative to control a computer to manage memory is provided. A state-priority is assigned to each state of a plurality of processes. A request for a memory allocation is received from a first process of the plurality of processes, the first process being in a first state and having a first assigned state-priority. A total amount of memory available for allocation is determined. If the total amount is greater than or equal to the request, a partition of memory to the first process in an amount equal to at least the requested amount is then allocated. However, if the total amount is less than the request, one or more of the processes having a current state-priority which is lower than the first assigned state-priority is shut down, starting with the process with the lowest assigned state-priority, so that memory equal or greater to the request minus the total amount is freed. A partition of memory to the first process in an amount equal to at least the requested amount is then allocated.

In still another embodiment of the present invention, a computer readable medium, having stored thereon, computer executable process steps operative to control a computer to manage memory, is provided. A priority is assigned to each of a plurality of processes. A request for memory is then received from a first process of the plurality of processes, the first process having a first priority. A total amount of memory available for allocation is then determined. If the total amount is greater than or equal to the request, a partition of memory is then allocated to the first process in an amount equal to at least the requested amount. If the total amount is less than the request, one or more of the plurality of processes with an assigned priority lower than the first priority are shut-down, starting with the process of the plurality of processes having the lowest assigned priority, so that memory equal or greater to the request minus the total amount is freed. A partition of memory is then allocated to the first process in an amount equal to at least the requested amount.

A computer readable medium, having stored thereon, computer executable process steps operative to control a computer to manage memory. A request for a memory allocation from a requesting process is received. A total amount of memory available for allocation is determined. If the total amount is greater than the request, sufficient memory is allocated to the requesting process to fulfill the request. If the total amount is less than the request, one or more other processes to shut down are selected by a user. The selected processes are shut-down and any memory associated with the processes is freed. The steps of selecting and shutting down steps are repeated until memory equal or greater to the request minus the total amount is freed. Sufficient memory is then allocated to the requesting process to fulfill the request.

In accordance with another embodiment of the present invention, a system comprises a memory manager, a memory, and a plurality of processes, each process having one or more states, each state having a corresponding assigned state-priority. A requesting process of the plurality of processes is operative to send a request for a memory allocation to the memory manager, the request having associated therewith a requested amount of memory. The memory manager is operative to receive the request for a memory allocation from the requesting process of the plurality of processes. The memory manager determines a total amount of memory available for allocation and compares the total amount to the requested amount. If the total amount is greater than or equal to the requested amount, an amount of memory equal to at least the requested amount is allocated to the requesting process. On the other hand, if the total amount is less than the request, one or more processes are selected to request memory de-allocation from based upon the current assigned state-priorities. De-allocation of memory from the selected processes is then requested. The one or more of the plurality of processes is operative to free memory in accordance with a predetermined set of rules when requested by the memory manager. Any memory freed by the one or more processes is then deallocated, and an amount of memory equal to at least the requested amount is then allocated by the memory manager to the requesting process.

DETAILED DESCRIPTION OF THE PREFERRED EMBODIMENTS

Figure 1:
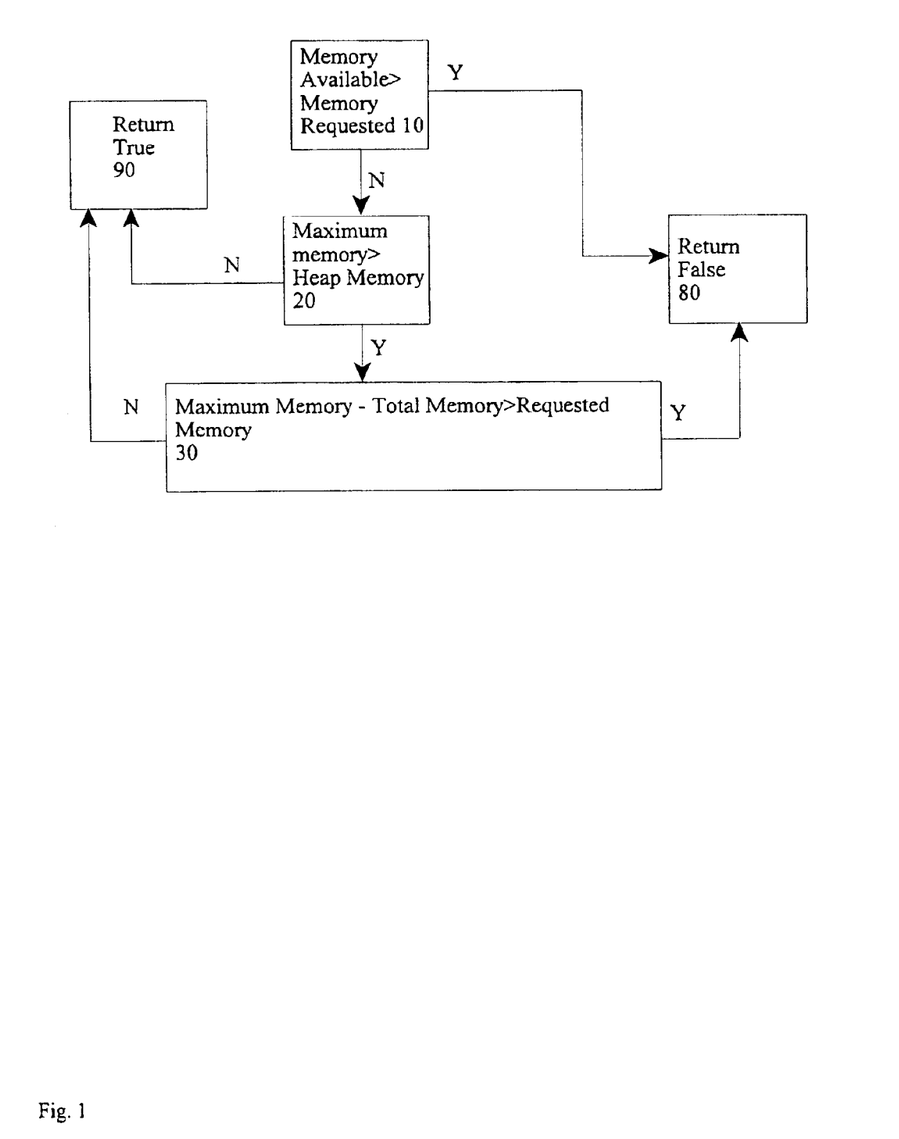
FIG. 1 is a flow chart for a memory checker function in accordance with an illustrative embodiment of the present invention.

FIG. 1 and Table 1 show a memory checker function for a memory manager in accordance with an embodiment of the present invention. Upon receiving a request, the memory manager queries for available memory. First, the method determines whether the memory available for a function (e.g., a process) is greater than the memory requested (step 10). If so, the method returns false (a false return allows the requesting process to allocate memory) (step 80). If not, the method then determines whether the maximum available memory is greater than the total amount of memory already allocated on a heap (step 20). If step 20 is true, then the total amount of memory already allocated is subtracted from the maximum memory available and the results compared to the memory requested to ascertain whether said result is greater than the memory requested (step 30). If step 30 is true, then the method returns false (step 80). Otherwise, the method returns true (step 90).

The query for available memory can be done by the Java Runtime.freememory( ) command, which returns the amount of memory available on the Java heap. Table 1 shows exemplary source code for implementing the memory checker function using the Java freememory( ) command:

TABLE 1

```
/* Check whether the runtime is low on memory. If this
* method returns true, such a component should stop its operation
* and free up the memory it has allocated.
*/
    public boolean MemoryChecker() {
        long mem = Runtime.getRuntime().freeMemory();
        // Enough memory?
            if (mem>minMemory) return false;
        // Do we allow the heap to grow?
            long total = Runtime.getRuntime().totalMemory();
            if (maxMemory>total) {
                mem+=maxMemory-total;
```

TABLE 1-continued

```
                if (mem>minMemory) return false;
            }
            return true;
    }
}
```

Preferably, the amount of memory requested for a given process is set with the SetMinMemory command and, in step 10 a GetMinMemory command can be used to query SetMinMemory to ascertain an amount of memory requested.

Table 2 shows exemplary source code for implementing the setMinMemory( ) command:

TABLE 2

```
/**
* Set the minimum amout of memory. Basically if the amount
* of free heap is under this value, the browser will go into
* the error recovery mode.
*/
    public void setMinMemory(long m) {
        minMemory = m;
    }
```

It should be noted that it is difficult to determine how much memory is available on the heap because Java has internal memory functions that are invisible to applications. Therefore, the Runtime.freememory( ) command should be considered an estimate of the free memory. A number of procedures can be used to address this issue. For example, the MinMemory could be set to a value greater than the actual memory needed. Alternatively, more complex calculations could be used to estimate the available memory from the Runtime.freememory( ) value.

Table 3 shows exemplary source code for implementing the getMinMemory( ) command.

TABLE 3

```
/**
* Get the minimum amount of memory
*/
    public long getMinMemory() {
        return minMemory;
    }
```

Preferably, the maximum amount of memory on the heap can be set with the setMaxMemory command and, in step 20, the GetMaxMemory command can query GetMaxMemory to ascertain the maximum available memory.

Table 4 shows an exemplary source code for implementing the setMaxMemory command:

TABLE 4

```
/**
* Set the maximum amount of jvm heap. This should be the same
* value as you give to jvm (normally with -mx parameter). The
* memory manager will use this number to determine whether it
* is low on memory.
    public void setMaxMemory(long m) {
        maxMemory = m;
    }
```

Table 5 shows an exemplary source code for implementing the GetMaxMemory( ) command:

TABLE 5

```
/**
 * Get maximum amount of jvm heap.
 */
    public long GetMaxMemory() {
        return maxMemory;
    }
```

Figure 2:
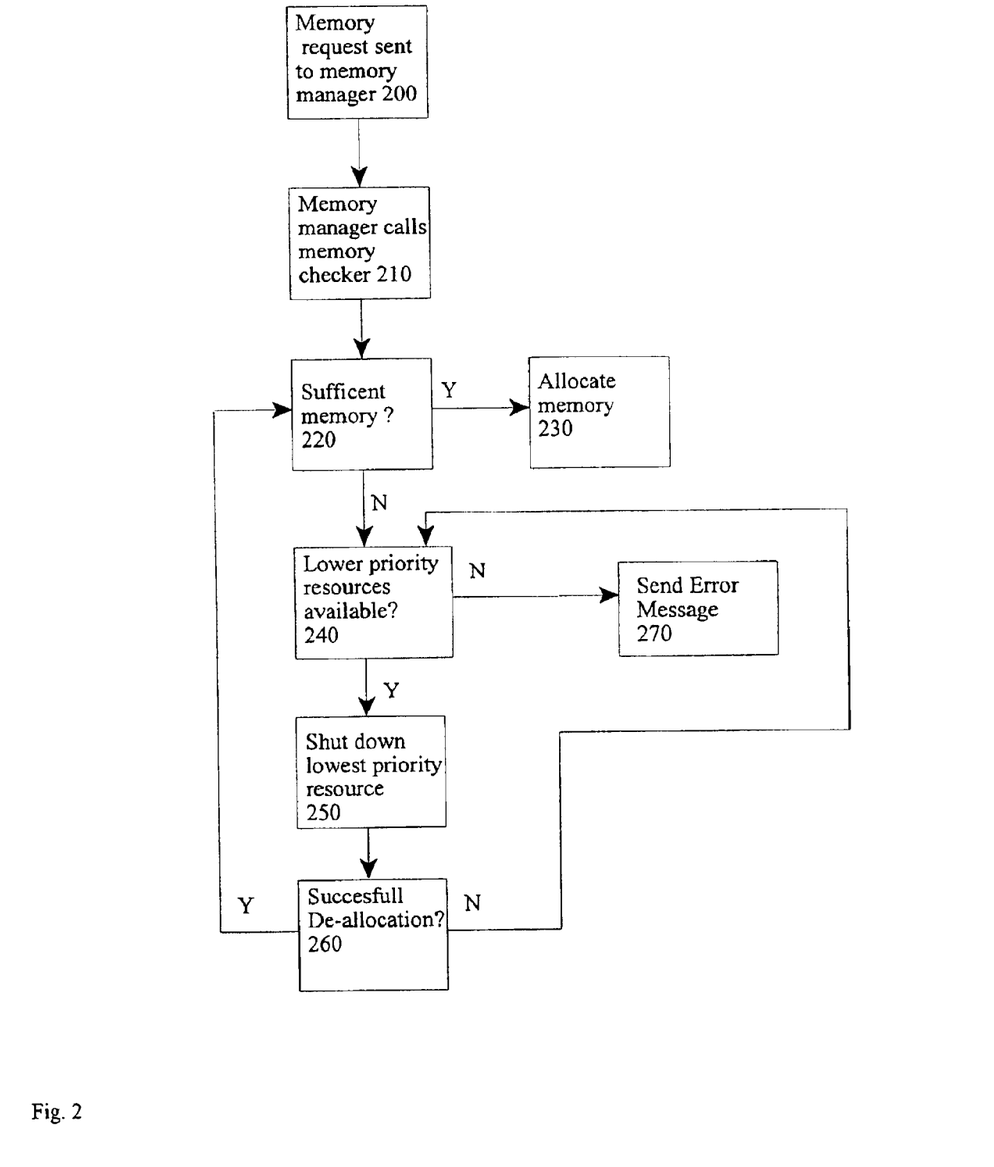
FIG. 2 shows a first embodiment of the method for allocating memory from the heap, which uses a priority scheme to shut down processes.

FIG. 2 shows a first embodiment of a method for allocating memory from the heap, which uses a priority scheme to shut down processes. In order to implement the priority scheme, each process, which can be an application or part thereof, is assigned a priority number. The processes can be represented from low-to-high or high-to-low (e.g., 0–255 or 255–0), so long as the priority scheme is consistently applied. For example, an e-mail process may be assigned a priority level of 3, while a TCP/IP stack manager may have a priority level of 20. In certain embodiments, the priority numbers can be stored in a control data structure that controls for the process (e.g., the process control block). In other embodiments, the priority numbers can be stored in a table.

When a process requires a memory allocation, the process sends a request to the memory manager indicating the amount of memory desired (step 200). The manager calls the memory checker (step 210), shown in FIG. 1, which returns the amount of memory available. The memory manager checks if sufficient memory is available (step 220), e.g., by comparing the amount of memory available to the amount of memory requested, and if sufficient memory is available, the memory is allocated to the process (step 230). In general, memory is allocated by allocating a partition of memory to the process.

In any event, if sufficient memory is not available, the memory manager checks if there are lower priority memory using processes that have been assigned a lower priority number, which can be shut down in order to obtain the necessary memory (step 240). In certain embodiments, the memory manager performs the check by use of a function that access the control data structure to determine the priority number. In other embodiments, the table with the priority numbers can be checked. If so, the manager shuts down the process(es) with the lowest priority (step 250), and then checks to see if the memory from the shut-down process(es) is successfully de-allocated (step 260). The memory manager then returns to the step of checking if sufficient memory is available (step 220). In the event that the memory is not successfully de-allocated, the method returns to step 240. If no lower priority states are available, the manager returns an error to the user (step 270) and/or calls another of memory allocation procedure, as shown in FIGS. 3,4,5,6.

For example, assume three processes exist: a first process with a priority level of 7, a second process with priority level of 2, and a third process with a priority level of 9. If the first process with a priority level of 7 requests memory, and the memory manager finds that not enough memory is available, the second process with a priority level of 2 is shut down. The process is shut-down because the second process has a lower priority level. However, the third process, which has a priority level of 9, is not shut down, as the third process has a higher priority level. If the memory from one of the processes cannot successfully de-allocate or not enough memory is freed by shutting down the second process, then an error is generated.

Figure 3:
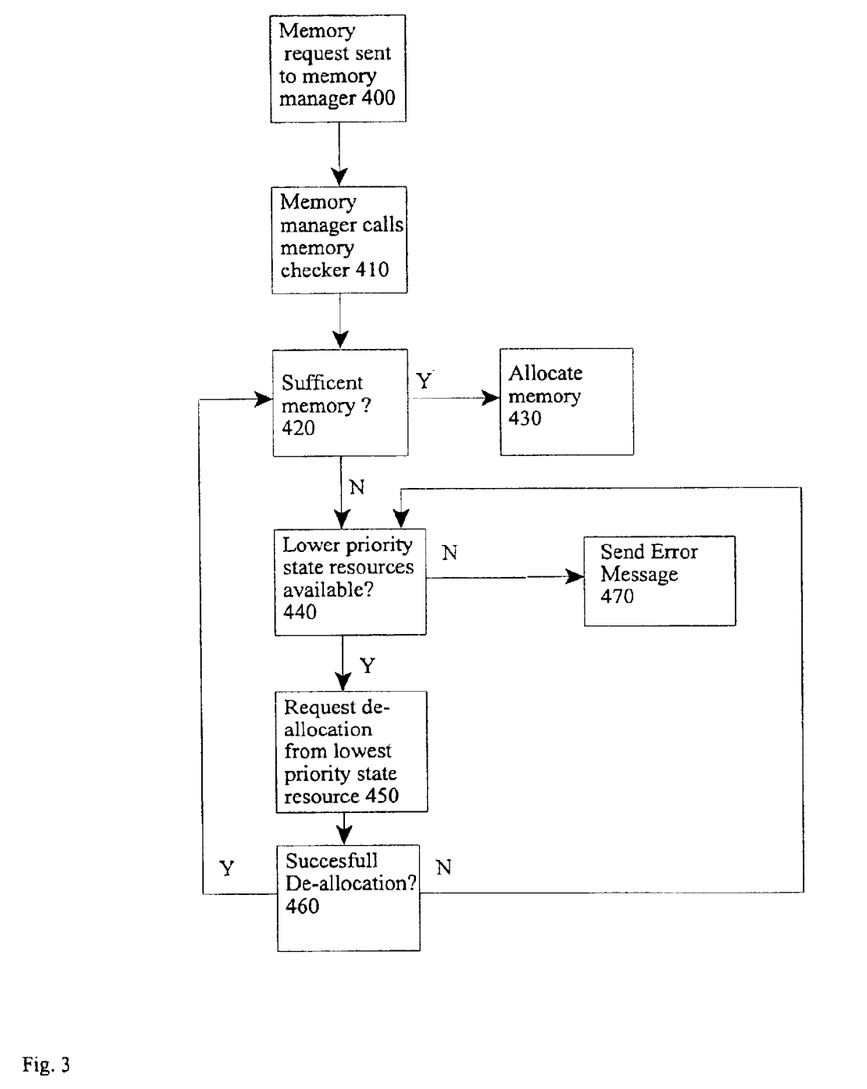
FIG. 3 shows a second embodiment of the method for allocating memory from the heap, which uses a priority-state scheme to shut down processes.

FIG. 3 shows a second embodiment of the method for allocating memory from the heap, which uses a priority-state scheme to shut down processes. In order to implement the priority-state scheme, each process that uses memory is assigned one or more priority numbers. For example, an e-mail process may be assigned a priority level of 3 when in a waiting state and 25 when in a composing state, while a TCP/IP stack manager may have a priority level of 20, regardless of what state it is in. In certain embodiments, the priority numbers for the state are stored in a data structure that controls access to the different states (e.g., the process control block). In other embodiments, a state table is used to store the priority numbers.

When a process requires a memory allocation, the process sends a request to the memory manager indicating the amount of memory desired (step 400). The manager calls the memory checker (step 410), shown in FIG. 1, which returns the amount of memory available. The memory manager then checks to see if sufficient memory is available (step 420), e.g., by comparing the amount of memory available to the amount of memory requested, and if sufficient memory is available, the memory is allocated to the process (step 430). However, if sufficient memory is not available, the manager instead checks to see if there is a lower priority memory using state(s) that can be shut down in order to obtain the necessary memory (step 440), e.g., process states that have been assigned a lower priority number. In certain embodiments, the memory manager performs the check by use of a function that access the process control data structure to determine the priority number. In other embodiments, the table with the priority numbers can be checked. If available, the manager shuts down the memory using state(s) with the lowest priority (step 450), and then checks to see if the memory from the shut-down state is successfully de-allocated (step 460). The process then returns to the step of checking if there is sufficient memory is available for the process (step 420). In the event that the memory is not successfully de-allocated, the method returns to step 440. If no lower priority states are available, the manager returns an error to the user (step 470) and/or calls another memory allocation procedure, as shown in FIGS. 2,4,5,6.

For example, assume that a first process has a priority level of 7; a second process has priority level of 2, if in a first state, and a priority level of 2000, if in a second state; and a third process has a priority level of 9 regardless of what state it is in. If the first process, which has a priority level of 7, requests memory and the memory manager finds that not enough memory is available, the second process is shut-down if in the first state. However, if the second process is in the second state, then it is not shut-down. The third process, which has a priority level of 9 is not shut down, since the third process has a higher priority level. If the memory from one of the process states cannot successfully de-allocate or not enough memory is freed by shutting down the second process when it is in the first state, then an error is generated. Thus, an error is generated if the second process is in the second state, as no memory is de-allocated.

Figure 4:
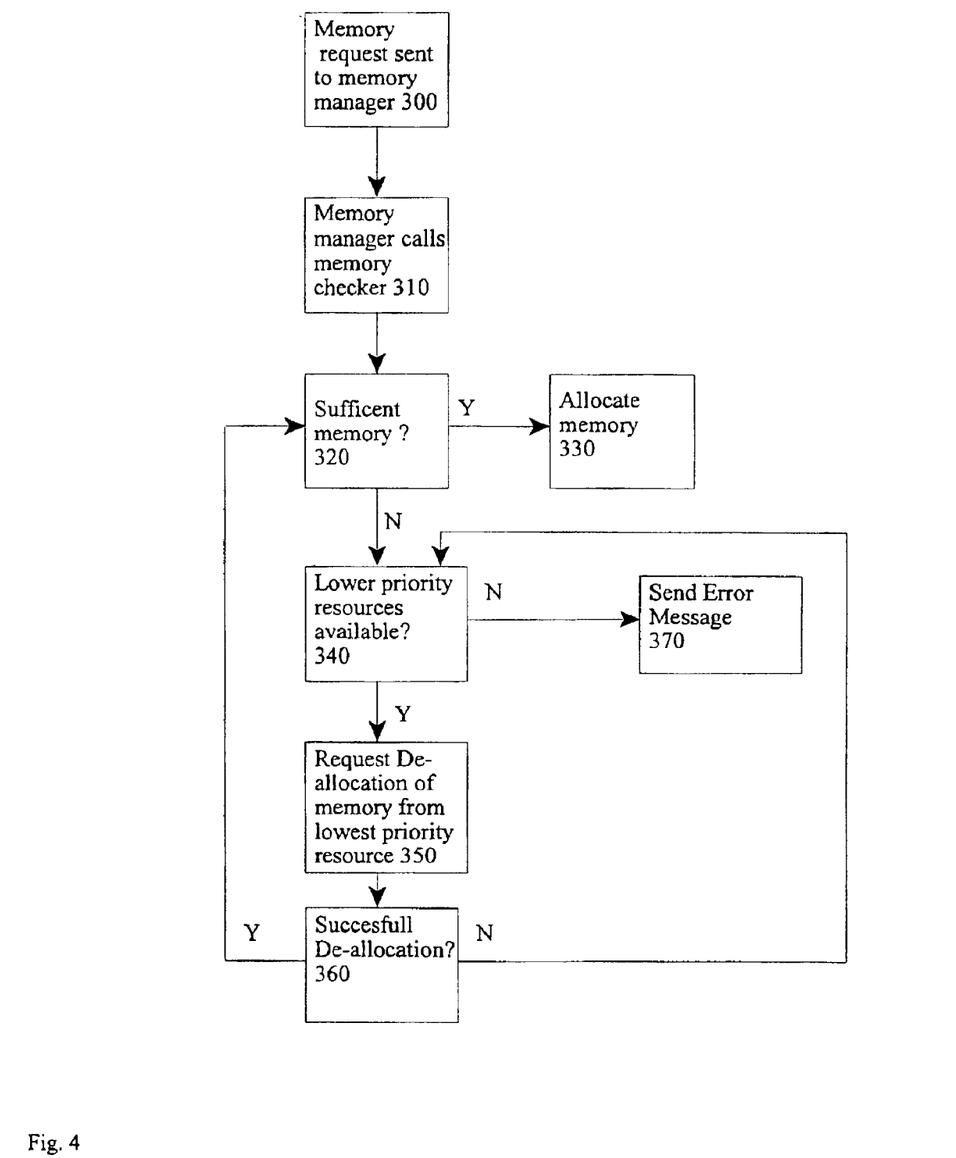
FIG. 4 shows a third embodiment of the method for allocating memory from the heap, which uses a priority scheme to request memory from processes.

FIG. 4 shows a third embodiment of the method for allocating memory from the heap, which uses a priority scheme to request memory from processes. In order to implement the priority scheme, each process that uses memory is assigned one or more priority numbers. For example, an e-mail process may be assigned a priority level of 3, while a TCP/IP stack manager may have a priority level of 20. Also, each process has a set of rules that tell it what sub-processes (e.g., processes that make up the current process) can or cannot be shut down upon receiving a memory request. For example, the set of rules for the e-mail process may shut-down all inactive windows on receipt of the memory request.

When an process needs memory allocated to it, the process sends a request to the memory manager indicating the amount of memory desired (step 300). The manager calls the memory checker (step 310), shown in FIG. 1, which returns the amount of memory available. The memory manager then checks to see if sufficient memory is available (step 320), e.g., by comparing the amount of memory available to the amount of memory requested, and if sufficient memory is available, the memory is allocated to the process (step 330). However, if sufficient memory is not available, the manager instead checks to see if there are lower priority memory using processes that can be requested for memory (step 340), e.g., process states that have been assigned a lower priority number. If available, the manager requests the memory from the process(es) with the lowest priority (step 350). The requested process then follows the set of rules that is has been assigned to de-allocate the memory. Next, the memory manager checks to see if successfully de-allocation occurred (step 360). If so, the process then returns to the step of checking for sufficient memory (step 320). In the event that the memory is not successfully de-allocated the method returns to step 340. From step 340, if no lower priority states are available, the manager returns an error to the user (step 370) and/or calls another memory allocation procedure, as shown in FIGS. 2,3,5,6.

For example, assume the first process has a priority level of 7; the second process has priority level of 2 and a set of rules specifying that on the memory request the process closes all in-active windows; and the third process has a priority level of 9. If the first process, which has a priority level of 7, requests memory and the memory manager finds that not enough memory is available, the memory manager requests that the second process de-allocate memory pursuant to the set of rules associated with the second process (close all in-active windows). The second process then attempts to close any in-active windows that it may have. The third process, which has a priority level of 9 will not be requested to free memory, because the third process has a higher priority level. If the memory requested from the second process cannot successfully de-allocate or not enough memory is freed by shutting down the in-active windows of the second process, then an error is generated.

It should be noted that the memory management system in accordance with the fourth embodiment may also utilize the priority-states of the third embodiment. For example, when determining whether to request that an process shut down, the memory manager may consider the priority-state of the process. Applying this scheme to the example above, and assuming that the second process has a priority of 2 when in a first state and a priority of 8 when in a second state, the memory manager would only request the second process to de-allocate memory if the second process is in the first state.

Figure 5:
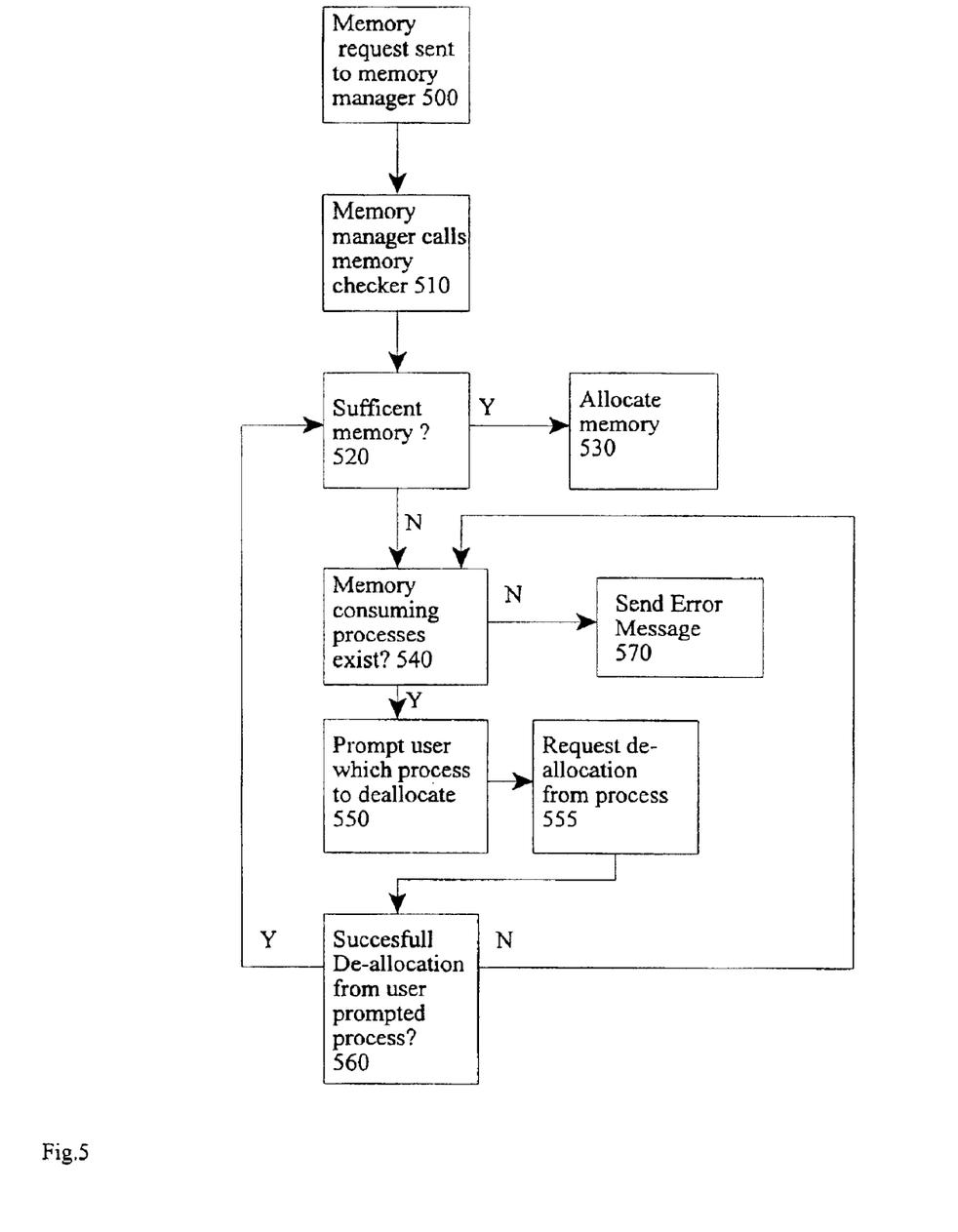
FIG. 5 shows a fifth embodiment of the method for allocating memory from the heap, which uses a user interface.

FIG. 5 shows a fifth embodiment of the method for allocating memory from the heap, which uses a user interface. When an process requires a memory allocation, the process sends a request to the memory manager indicating the amount of memory desired (step 500). The manager calls the memory checker (step 510), shown in FIG. 1, which returns the amount of memory available. The memory manager checks if sufficient memory is available (step 520), e.g., by comparing the amount of memory available to the amount of memory requested. If sufficient memory is available, the memory is allocated to the process (step 530). However, if sufficient memory is not available, the manager instead checks to see if there are other memory using processes on the system, e.g., other processes or process states (step 540). The user is then shown a list of the active processes and prompted to select a process or processes to request de-allocation from (step 550). The manager then requests the process(es) that the user has selected to de-allocate memory, e.g., the memory manager requests the process to shut-down or free memory pursuant to a set of rules associated with the process (step 555). The memory manager then performs a check to see if the memory from the request is successfully de-allocated (step 560). The memory manager then returns to the step of checking if sufficient memory is available (step 500). In the event that the memory is not successfully de-allocated the method returns to step 540. If no lower priority states are available, the manager returns an error to the user (step 570) and/or calls another memory allocation procedure, as shown in FIGS. 2,3,4,6.

In certain further aspects of this embodiment, the user has the option of requesting the process to free memory pursuant to a set of rules associated with the process (as in the fourth embodiment) or to simply shut-down the process. In other aspects of this embodiment, the user specifies criteria to be applied when shutting down the process(es). For example, the user specifies a set of rules, and the memory manager shuts down the process pursuant to the set of rules.

For example, assume that the first process has a priority level of 7; the second process, which has a set of rules specifying that on the memory request the process closes all in-active windows, has priority level of 2; and the third process has a priority level of 9. If the first process, which has a priority level of 7, requests memory and the memory manager finds that not enough memory is available, the memory manager checks to see what other process are running and prompts the user to select which process to shut-down or request memory from.

If the user requests memory from the second process, the second process will attempt to de-allocate memory in accordance with its set of rules (in this case, closing all inactive windows). In contrast, if the user chooses the "shut-down" option, the memory manager attempts to shut-down the second process.

Although the third process, which has a priority level of 9, is at a higher priority then the requesting process, the user can also request that the memory manager request memory from the third process or shut-down the third process. The memory manager would then request memory from the third process (or attempt to shut-down the third process). In the event the memory does not successfully de-allocate or not enough memory is de-allocated, an error is generated.

Figure 6:
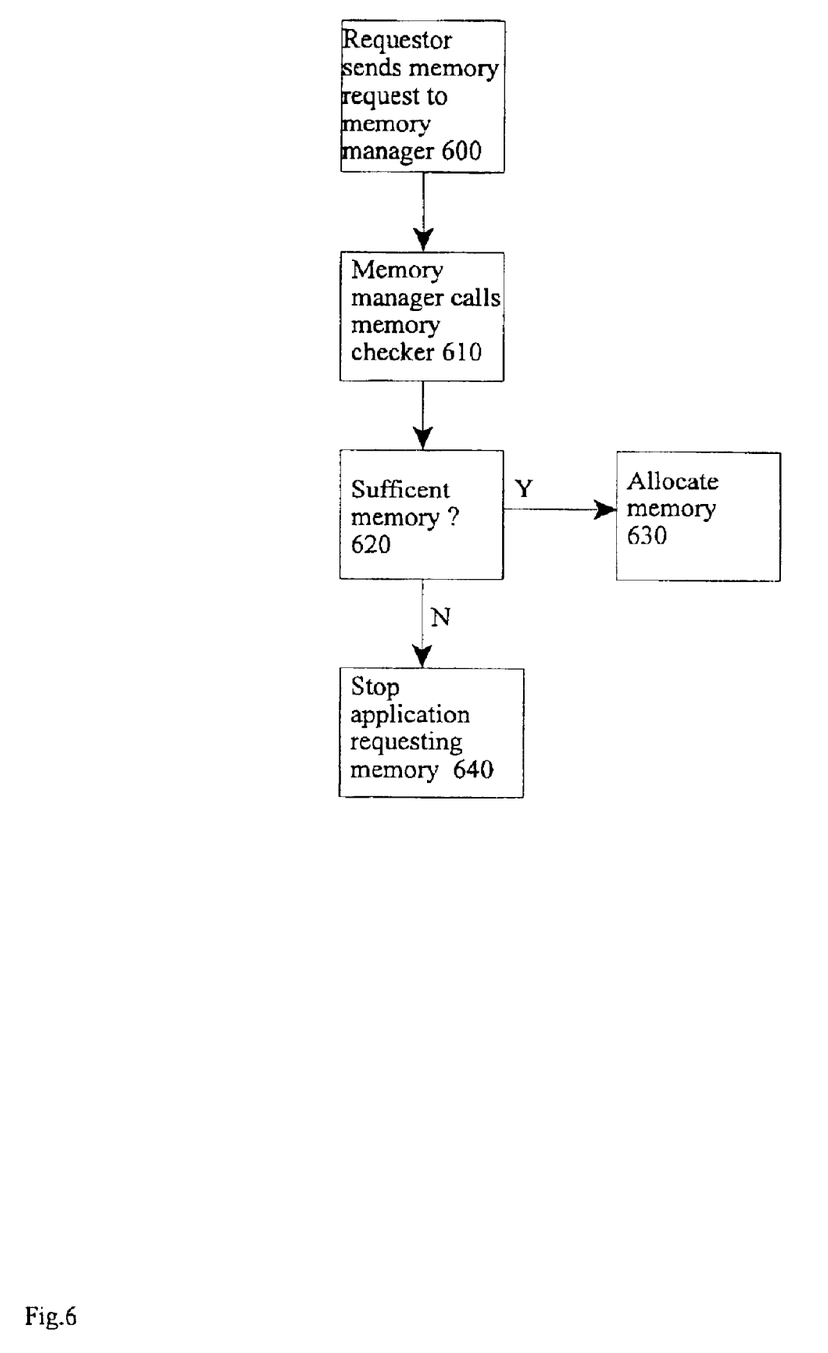
FIG. 6 shows a fifth embodiment of the method for allocating memory from the heap, which stops the requesting function.

FIG. 6 shows a fifth embodiment of the method for allocating memory from the heap, which stops the requesting function. In accordance with this embodiment, if an process requires a memory allocation, the process sends a request to the memory manager indicating the amount of memory desired (step 600). The manager calls the memory checker (step 610), shown in FIG. 1, which returns the amount of memory available. The memory manager checks if sufficient memory is available (step 620), e.g., by comparing the amount of memory available to the amount of memory requested, and if sufficient memory is available, the memory is allocated to the process (step 630). However, if sufficient memory is not available, the memory manager does not allocate the memory to the requesting process, and issues a stop command to the requesting process (step 640). In certain embodiments, the requesting process can be placed in a pending queue to wait for other processes to free memory.

It should be noted that the various embodiments of the present invention can be combined to provide additional functionality. For example, the sixth embodiment could be combined with any one of the first, second, third, fourth, and fifth embodiments so that, if the memory manager is unable to deallocate memory from another process, a stop command is issued to the requesting process.

In certain aspects of the above embodiment, the memory manager and process(es) may execute on a plurality of processing units. Moreover, the memory can be distributed on the processing units. However, from the perspective of the memory manager, the memory is managed as an entire memory unit. Thus, memory used by a first process on a first processing unit can be used by a second process on a second processing unit after the memory is freed from the first processing unit.

The present invention can be based on a Java implementation, although the above mentioned embodiments are equally applicable to other programming environments. Moreover, the present invention can be implemented as a JVM (Java Virtual Machine) or other Java bytecode implementations.

In the preceding specification, the invention has been described with reference to specific exemplary embodiments thereof. It will, however, be evident that various modifications and changes may be made thereto without departing from the broader spirit and scope of the invention as set forth in the claims that follow. The specification and drawings are accordingly to be regarded in an illustrative manner rather than a restrictive sense.

What is claimed is:

1. A method for managing a memory, comprising the steps of:
    receiving a request for a memory allocation from a first application, the request comprising a requested memory amount;
    determining a total amount of a memory available to the first application;
    freeing a partition of the memory sufficient for the first application based on the requested memory amount; and
    allocating the partition to the first application;
    wherein the step of freeing further comprises shutting down a second application.

2. A method for managing a memory, comprising the steps of:
    receiving a request for a memory allocation from a first application, the request comprising a requested memory amount;
    determining a total amount of a memory available to the first application;
    freeing a partition of the memory sufficient for the first application based on the requested memory amount; and
    allocating the partition to the first application;
    wherein the step of freeing further comprises the steps of
    attempting to shut down a second application,
    determining whether the partition is free,
    proceeding to the allocating step if the partition is free, and
    generating an error if the partition is not free.

3. A method for managing a memory, comprising the steps of:
    receiving a request for a memory allocation from a first application, the request comprising a requested memory amount;
    determining a total amount of a memory available to the first application;
    freeing a partition of the memory sufficient for the first application based on the requested memory amount; and
    allocating the partition to the first application;
    wherein the step of freeing further comprises the steps of
    attempting to shut down a second application,
    determining whether the partition is free,
    proceeding to the allocating step if the partition is free, and
    issuing a stop command to the first application if the partition is not free.

4. A method for managing a memory, comprising the steps of:
    receiving a request for a memory allocation from a first application, the request comprising a requested memory amount;
    determining a total amount of a memory available to the first application;
    freeing a partition of the memory sufficient for the first application based on the requested memo amount; and
    allocating the partition to the first application;
    wherein the step of freeing further comprises sending a de-allocation request to a second application.

5. The method of claim 4, wherein the step of freeing further comprises the steps of
    determining whether the partition is free,
    proceeding to the allocating step if the partition is free, and
    generating an error if the partition is not free.

6. The method of claim 4, wherein the step of freeing further comprises the steps of
    determining whether the partition is free,
    proceeding to the allocating step if the partition is free, and
    generating a stop command to the first application if the partition is not free.

7. A method for managing a memory, comprising the steps of:
    receiving a request for a memory allocation from a first application, the request comprising a requested memory amount;
    determining a total amount of a memory available to the first application;
    freeing a partition of the memory sufficient for the first application based on the requested memory amount; and
    allocating the partition to the first application;
    wherein the memory is organized in a heap; and wherein the step of freeing a partition of memory further comprises freeing the partition of memory from the heap.

8. The method as recited in claim 7, wherein the heap is of a type used in a Java programming language.

9. A method for managing a memory comprising the steps of:

assigning a priority to each of a plurality of processes;

receiving a request from a first one of the plurality of processes, the request comprising a requested memory amount;

determining a total amount of memory available for allocation;

if the total amount of memory available is less than the requested amount, freeing a partition of the memory equal to at least the requested amount by freeing memory from one or more of the plurality of processes having an assigned priority which is lower than the assigned priority of the first process; and allocating the partition of the memory to the first process.

10. The method as recited in claim 9, wherein the processes are applications.

11. The method of claim 9, wherein the step of freeing further comprises shutting down one or more of the plurality of processes having an assigned priority lower than the assigned priority of the first process.

12. The method of claim 9, wherein the step of freeing further comprises the steps of attempting to shut down one or more of the plurality of processes having an assigned priority lower than the assigned priority of the first process, determining whether the partition is free, proceeding to the allocating step if the partition is free, and generating an error if the partition is not free.

13. The method of claim 9, wherein the step of freeing further comprises the steps of attempting to shut down one or more of the plurality of processes having an assigned priority lower than the assigned priority of the first process, determining whether the partition is free, proceeding to the allocating step if the partition is free, and issuing a stop command to the first application if the partition is not free.

14. The method of claim 9, wherein the step of freeing further comprises sending a de-allocation request to a second process of the plurality of processes.

15. The method of claim 14, wherein the step of freeing further comprises the steps of determining whether the partition is free, proceeding to the allocating step if the partition is free, and generating an error if the partition is not free.

16. The method of claim 14, wherein the step of freeing further comprises the steps of determining whether the partition is free, proceeding to the allocating step if the partition is free, and issuing a stop command to the second process if the partition is not free.

17. The method as recited in claim 9 wherein the memory is organized in a heap; and wherein the step of freeing a partition of memory further comprises freeing the partition of memory from the heap.

18. The method as recited in claim 17 wherein the heap is of a type used in a Java programming language.

19. The method as recited in claim 9 wherein the requested memory amount is determined by the user.

20. The method as recited in claim 9 wherein the total memory amount is determined by the user.

21. The method of claim 9, wherein the determining step comprises estimating the total amount of memory available for allocation.

22. A method for managing memory comprising the steps of:

(a) assigning a state-priority to each state of a plurality of processes;

(b) receiving a request for a memory allocation from a first process of the plurality of processes, the first process being in a first state and having a first assigned state-priority;

(c) determining a total amount of memory available for allocation;

(d) if the total amount is greater than or equal to the request, allocating a partition of memory to the first process in an amount equal to at least the requested amount; and (e) if the total amount is less than the request, shutting down one or more of the processes having a current state-priority which is lower than the first assigned state-priority, starting with the process with the lowest current state-priority, so that memory equal to or greater than the request minus the total amount of memory available for allocation is freed, and allocating a partition of memory to the first process in an amount equal to at least the requested amount.

23. The method of claim 22, wherein at least one of the plurality of processes has a plurality of states, and wherein at least two of the plurality of states have different state-assigned priorities.

24. The method of claim 22, wherein step (e) further comprises the steps of:

(e) (1) attempting to shut down the process with the lowest current state-priority, (e) (2) determining whether a partition of memory associated with the process is free, (e) (3) proceeding to the allocating step if the partition is free, (e) (4) if the partition is not free, repeating steps (e) (2) and (e) (3) for a next process of the one or more processes having a next lowest current state-priority; and (e) (5) generating an error if the partition is not free, and if steps (e)(2) and (e)(3) have been performed for each of the one or more processes.

25. The method of claim 22, wherein step (e) further comprises the steps of:

(e) (1) attempting to shut down the process with the lowest current state-assigned priority, (e) (2) determining whether a partition of memory associated with the process is free, (e) (3) proceeding to the allocating step if the partition is free, (e) (4) if the partition is not free, repeating steps (e)(2) and (e)(3) for a next process of the one or more processes having a next lowest current state-priority; and (e) (5) issuing a stop command to the first process if the partition is not free, and if steps (e) (2) and (e) (3) have been performed for each of the one or more processes.

26. The method as recited in claim 22 wherein the memory is organized in a heap; and wherein the step of allocating a partition of memory further comprises allocating the partition of memory from the heap.

27. The method as recited in claim 26 wherein the heap is of a type used in a Java programming language.

28. The method of claim 22, wherein step (c) comprises estimating the total amount of memory available for allocation.

29. A method for managing memory comprising the steps of:
 (a) assigning a priority to each of a plurality of processes;
 (b) receiving a request for memory from a first process of the plurality of processes, the first process having a first priority;
 (c) determining a total amount of memory available for allocation;
 (d) if the total amount is greater than or equal to the request, allocating a partition of memory to the first process in an amount equal to at least the requested amount;
 (e) if the total amount is less than the request, shutting down one or more of the plurality of processes with a priority lower than the first priority, starting with the process of the plurality of processes having the lowest assigned priority, so that memory equal to or greater than the request minus the total amount of memory available for allocation is freed, and allocating a partition of memory to the first process in an amount equal to at least the requested amount.

30. The method of claim 29, wherein step (e) further comprises the steps of:
 (e) (1) attempting to shut down the process with the lowest assigned priority,
 (e) (2) determining whether the partition is free,
 (e) (3) proceeding to the allocating step if the partition is free,
 (e) (4) if the partition is not free, repeating steps (e)(2) and (e)(3) for a next process of the one or more processes having a next lowest priority; and
 (e) (5) generating an error if the partition is not free, and if steps (e)(2) and (e)(3) have been performed for each of the one or more processes.

31. The method of claim 29, wherein step (e) further comprises the steps of:
 (e) (1) attempting to shut down the process with the lowest assigned priority,
 (e) (2) determining whether the partition is free,
 (e) (3) proceeding to the allocating step if the partition is free,
 (e) (4) if the partition is not free, repeating steps (e) (2) and (e) (3) for a next process of the one or more processes having a next lowest priority; and
 (e) (5) issuing a stop command to the first process if the partition is not free, and if steps (e)(2) and (e)(3) have been performed for each of the one or more processes.

32. The method as recited in claim 29 wherein the memory is organized in a heap; and wherein the step of allocating a partition of memory further comprises allocating the partition of memory from the heap.

33. The method as recited in claim 32 wherein the heap is of a type used in a Java programming language.

34. The method of claim 29, wherein step (c) comprises estimating the total amount of memory available for allocation.

35. A method for managing memory comprising the steps of:
 receiving a request for a memory allocation from a requesting process;
 determining a total amount of memory available for allocation;
 if the total amount is greater than the request, allocating sufficient memory to the requesting process to fulfill the request;
 if the total amount is less than the request:
  receiving a selection of one or more other processes to shut down from a user,
  shutting down the selected processes and freeing any memory associated with the processes,
  repeating the steps of selecting and shutting down steps until memory equal to or greater than the request minus the total amount of memory available for allocation is freed; and
  allocating sufficient memory to the requesting process to fulfill the request.

36. The method as recited in claim 35 wherein the selection is controlled by the user specifying a set of rules to determine which process to shut down.

37. The method as recited in claim 35 further comprising the step of displaying an indication of the one or other processes to the user.

38. A memory manager comprising a processing device coupled to a memory, the processing device operative to:
 (a) receive a request for a memory allocation from a requesting process;
 (b) determine a total amount of memory available for allocation;
 (c) compare the total amount to the request;
  (c)(1) if the total amount is greater than or equal to the request, allocating sufficient memory to the requesting process to fulfill the request;
  (c)(2) if the total amount is less than the request, select one or more processes of the plurality of processes to shut down, shut down the selected processes, free any memory associated with the processes, and allocate sufficient memory to the requesting process to fulfill the request.

39. A system comprising:
 a plurality of processes;
 a memory; and
 a memory manager;
 a requesting process of the plurality of processes being operative to send a request for a memory allocation to the memory manager, the request having associated therewith a requested amount of memory;
 the memory manager operative to receive a request for a memory allocation from a requesting process; determine a total amount of memory available for allocation; compare the total amount to the requested amount; if the total amount is greater than or equal to the request, allocate an amount of memory equal to at least the requested amount to the requesting process; if the total amount is less than the request (i) select one or more of the plurality of processes to shut down, (ii) request shut down of the selected processes, (iii) free any memory associated with the processes that have shut down; repeat (i) through (iii) until memory equal to or greater than the request minus the total amount of memory available for allocation is freed; and allocate an amount of memory equal to at least the requested amount to the requesting process;
 the selected one or more of the plurality of processes operative to shut-down when requested by the memory manger and de-allocate memory when shutting down.

40. The system of claim 39 wherein the requested amount is included in the request.

41. A system comprising
a memory manager;
a memory;
a plurality of processes, each process having one or more states, each state having a corresponding assigned state-priority;
a requesting process of the plurality of processes being operative to send a request for a memory allocation to the memory manager, the request having associated therewith a requested amount of memory;
the memory manager operative to receive the request for a memory allocation from a requesting process of the plurality of processes; determine a total amount of memory available for allocation; compare the total amount to the requested amount; if the total amount is greater than or equal to the requested amount, allocate an amount of memory equal to at least the requested amount to the requesting process; if the total amount is less than the request, select one or more processes to shut down based upon the current assigned state-priorities; request the shut down of the selected processes; free any memory associated with the processes that shut down; and allocate an amount of memory equal to at least the requested amount to the requesting process;
the one or more of the plurality of processes operative to shut-down when requested by the memory manger; and de-allocate memory when shutting down.

42. The system of claim 41, wherein the requested amount is included in the request.

43. The system as recited in claim 41 wherein the memory manager and each process functions on a plurality of processing units; and wherein the memory is distributed among the processing units.

44. A computer readable medium, having stored thereon, computer executable process steps operative to control a computer to manage memory, the process steps comprising:
assigning a priority to each of a plurality of processes;
receiving a request from a first one of the plurality of processes, the request comprising a requested memory amount;
determining a total amount of memory available for allocation;
if the total amount of memory available is less than the requested amount, freeing a partition of the memory equal to at least the requested amount by freeing memory from one or more of the plurality of processes having an assigned priority which is lower than the assigned priority of the first process; and
allocating the partition of the memory to the first process.

45. A computer readable medium, having stored thereon, computer executable process steps operative to control a computer to manage memory, the process steps comprising:
assigning a state-priority to each state of a plurality of processes;
receiving a request for a memory allocation from a first process of the plurality of processes, the first process being in a first state and having a first assigned state-priority;
determining a total amount of memory available for allocation;
if the total amount is greater than or equal to the request, allocating a partition of memory to the first process in an amount equal to at least the requested amount;
if the total amount is less than the request, shutting down one or more of the processes having an assigned state-priority which is lower than the first assigned state-priority, starting with the process with the lowest assigned state-priority, so that memory equal or greater to the request minus the total amount is freed; allocating a partition of memory to the first process in an amount equal to at least the requested amount.

46. A computer readable medium, having stored thereon, computer executable process steps operative to control a computer to manage memory, the process steps comprising:
assigning a priority to each of a plurality of processes;
receiving a request for memory from a first process of the plurality of processes, the first process having a first priority;
determining a total amount of memory available for allocation;
if the total amount is greater than or equal to the request, allocating a partition of memory to the first process in an amount equal to at least the requested amount;
if the total amount is less than the request, shutting down one or more of the plurality of processes with an assigned priority lower than the first priority, starting with the process of the plurality of processes having the lowest assigned priority, so that memory equal or greater to the request minus the total amount is freed; and allocating a partition of memory to the first process in an amount equal to at least the requested amount.

47. A computer readable medium, having stored thereon, computer executable process steps operative to control a computer to manage memory, the process steps comprising:
receiving a request for a memory allocation from a requesting process;
determining a total amount of memory available for allocation;
if the total amount is greater than the request, allocating sufficient memory to the requesting process to fulfill the request;
if the total amount is less than the request:
selecting one or more other processes to shut down, the selection controlled by a user,
shutting down the selected processes and freeing any memory associated with the processes,
repeating the steps of selecting and shutting down steps until memory equal to or greater than the request minus the total amount of memory available for allocation is freed, and
allocating sufficient memory to the requesting process to fulfill the request.

48. The computer readable medium as recited in claim 47 wherein the selection is controlled by the user by one or more other specifying a set of rules to determine which process to shut down.

49. A method for managing a memory, comprising the steps of:
receiving a request for a memory allocation from a first application, the request comprising a requested memory amount;
determining a total amount of a memory available to the first application;
freeing a partition of the memory sufficient for the first application based on the requested memory amount; and
allocating the partition to the first application;
wherein the step of freeing includes sending a request for de-allocation of memory to a second application, and, in the second application, freeing memory in accordance with a predetermined set of rules for the second application.

50. A system comprising
a memory manager;
a memory;
a plurality of processes, each process having one or more states, each state having a corresponding assigned state-priority;
a requesting process of the plurality of processes being operative to send a request for a memory allocation to the memory manager, the request having associated therewith a requested amount of memory;
the memory manager operative to receive the request for a memory allocation from a requesting process of the plurality of processes; determine a total amount of memory available for allocation; compare the total amount to the requested amount; if the total amount is greater than or equal to the requested amount, allocate an amount of memory equal to at least the requested amount to the requesting process; if the total amount is less than the request, select one or more processes to request memory de-allocation from based upon the current assigned state-priorities; request de-allocation of memory from the selected processes; de-allocate any memory freed by the one or more processes; and allocate an amount of memory equal to at least the requested amount to the requesting process;
the one or more of the plurality of processes being operative to free memory in accordance with a predetermined set of rules when requested by the memory manager.

51. A method for managing a memory comprising the steps of:
receiving a request from a first one of the plurality of processes, the request comprising a requested memory amount;
estimating a total amount of memory available for allocation;
if the total amount of memory available is less than the requested amount, freeing a partition of the memory equal to at least the requested amount by freeing memory from one or more of the plurality of processes having an assigned priority which is lower than the assigned priority of the first process; and
allocating the partition of the memory to the first process.

52. A method for managing memory comprising the steps of:
(A) receiving a request for a memory allocation from a first process of the plurality of processes, the first process being in a first state and having a first assigned state-priority;
(B) determining a total amount of memory available for allocation;
(C) if the total amount is greater than or equal to the request, allocating a partition of memory to the first process in an amount equal to at least the requested amount; and
(D) if the total amount is less than the request, shutting down one or more of the processes having a current state-priority which is lower than the first assigned state-priority, starting with the process with the lowest current state-priority, so that memory equal or greater to the request minus the total amount is freed, and allocating a partition of memory to the first process in an amount equal to at least the requested amount.

53. A system comprising:
a plurality of processes;
a memory manager;
a requesting process of the plurality of processes being operative to send a request for a memory allocation to the memory manager, the request having associated therewith a requested amount of memory;
the memory manager operative to receive a request for a memory allocation from a requesting process; determine a total amount of memory available for allocation; compare the total amount to the requested amount; if the total amount is greater than or equal to the request, allocate an amount of memory equal to at least the requested amount to the requesting process; if the total amount is less than the request (i) select one or more of the plurality of processes to shut down, (ii) request shut down of the selected processes, (iii) free any memory associated with the processes that have shut down; repeat (i) through (iii) until memory equal to or greater than the request minus the total amount of memory available for allocation is freed; and allocate an amount of memory equal to at least the requested amount to the requesting process;
the selected one or more of the plurality of processes operative to shut-down when requested by the memory manager and de-allocate memory when shutting down.

54. A system comprising
a memory manager;
a plurality of processes, each process having one or more states, each state having a corresponding assigned state-priority;
a requesting process of the plurality of processes being operative to send a request for a memory allocation to the memory manager, the request having associated therewith a requested amount of memory;
the memory manger operative to receive the request for a memory allocation from a requesting process of the plurality of processes; determine a total amount of memory available for allocation; compare the total amount to the requested amount; if the total amount is greater than or equal to the requested amount, allocate an amount of memory equal to at least the requested amount to the requesting process; if the total amount is less than the request, select one or more processes to shut down based upon the current assigned state-priorities; request the shut down of the selected processes; free any memory associated with the processes that shut down; and allocate an amount of memory equal to at least the requested amount to the requesting process;
the one or more of the plurality of processes operative to shut-down when requested by the memory manager; and de-allocate memory when shutting down.

55. A Java virtual machine comprising:
a plurality of processes;
a memory manager;
a requesting process of the plurality of processes being operative to send a request for a memory allocation to the memory manager, the request having associated therewith a requested amount of memory;
the memory manager operative to receive a request for a memory allocation from a requesting process; determine a total amount of memory available for allocation; compare the total amount to the requested amount; if the total amount is greater than or equal to the request, allocate an amount of memory equal to at least the requested amount to the requesting process; if the total amount is less than the request (i) select one or more of the plurality of processes to shut down, (ii) request shut down of the selected processes, (iii) free any memory associated with the processes that have shut down; repeat (i) through (iii) until memory equal to or greater than the request minus the total amount of memory available for allocation is freed; and allocate an amount of memory equal to at least the requested amount to the requesting process;

the selected one or more of the plurality of processes operative to shut-down when requested by the memory manager and de-allocate memory when shutting down.

56. A Java virtual machine comprising a memory manager;

a plurality of processes, each process having one or more states, each state having a corresponding assigned state-priority;

a requesting process of the plurality of processes being operative to send a request for a memory allocation to the memory manager, the request having associated therewith a requested amount of memory;

the memory manager operative to receive the request for a memory allocation from a requesting process of the plurality of processes; determine a total amount of memory available for allocation; compare the total amount to the requested amount; if the total amount is greater than or equal to the requested amount, allocate an amount of memory equal to at least the requested amount to the requesting process; if the total amount is less than the request, select one or more processes to shut down based upon the current assigned state-priorities; request the shut down of the selected processes; free any memory associated with the processes that shut down; and allocate an amount of memory equal to at least the requested amount to the requesting process;

the one or more of the plurality of processes operative to shut-down when requested by the memory manager; and de-allocate memory when shutting down.

57. A method for managing a memory, comprising the steps of:

receiving a request for a memory allocation from a first application, the request comprising a requested memory amount;

determining a total amount of a memory available to the first application;

freeing a partition of the memory sufficient for the first application based on the requested memory amount; and allocating the partition to the first application;

wherein the determining step comprises estimating the total amount of memory available for allocation.

* * * * *